United States Patent
Stowe, Jr. et al.

(10) Patent No.: US 7,430,969 B2
(45) Date of Patent: Oct. 7, 2008

(54) METHOD FOR REDUCING THE AMOUNT OF A SULFUR DIOXIDE IN A FLUE GAS RESULTING FROM THE COMBUSTION OF A FOSSIL FUEL

(75) Inventors: Donald H. Stowe, Jr., New Waterford, OH (US); Ward S. Blakefield, Maysville, KY (US)

(73) Assignee: Omni Materials, Inc., Maysville, KY (US)

( * ) Notice: Subject to any disclaimer, the term of this patent is extended or adjusted under 35 U.S.C. 154(b) by 151 days.

(21) Appl. No.: 11/285,341

(22) Filed: Nov. 22, 2005

(65) Prior Publication Data

US 2006/0070561 A1  Apr. 6, 2006

Related U.S. Application Data

(63) Continuation of application No. PCT/US2004/16340, filed on May 25, 2004, which is a continuation-in-part of application No. 10/756,956, filed on Jan. 14, 2004, now Pat. No. 7,013,817.

(60) Provisional application No. 60/473,689, filed on May 28, 2003.

(51) Int. Cl.
*F23B 7/00* (2006.01)
(52) U.S. Cl. ...................... 110/345; 110/342
(58) Field of Classification Search .............. 110/342, 110/343, 344, 345
See application file for complete search history.

(56) References Cited

U.S. PATENT DOCUMENTS

| 4,208,388 | A | 6/1980 | Nicholson |
| 4,245,573 | A | 1/1981 | Dixit et al. |
| 4,246,245 | A | 1/1981 | Abrams |
| 4,552,683 | A | 11/1985 | Powell et al. |
| 4,555,996 | A | 12/1985 | Torbov et al. |
| 4,960,577 | A | 10/1990 | Torbov et al. |
| 5,220,875 | A | * 6/1993 | Cox ............................ 110/345 |
| 5,234,877 | A | 8/1993 | Pinnavaia et al. |
| 5,246,364 | A | 9/1993 | Landreth et al. |
| 5,967,061 | A | 10/1999 | Ashworth et al. |
| 6,146,607 | A | 11/2000 | Lavely, Jr. |
| 6,528,030 | B2 | 3/2003 | Madden |

OTHER PUBLICATIONS

Author: Gary M. Blythe Title: Furnace Injection of Alkaline Sorbents for Sulfuric Acid Removal Date: Jan. 2004 Total pp. 91.

* cited by examiner

*Primary Examiner*—Kenneth B Rinehart
(74) *Attorney, Agent, or Firm*—Beck & Thomas, P.C.

(57) ABSTRACT

A process for removal of sulfur dioxide from a flue gas. An alkaline admixture is coated with a coating agent that improves dispersability and delays calcination of the alkaline admixture within a combustion zone and results in a coated alkaline admixture. The coated alkaline admixture is introduced to the boiler to create a reaction that reduces the amount of sulfur dioxide from the flue gas.

16 Claims, 1 Drawing Sheet

METHOD FOR REDUCING THE AMOUNT OF A SULFUR DIOXIDE IN A FLUE GAS RESULTING FROM THE COMBUSTION OF A FOSSIL FUEL

CROSS REFERENCE TO RELATED APPLICATION

This application is a Continuation of Application No. PCT/US2004/16340 filed May 25, 2004, which is a PCT application claiming priority of Nonprovisional application Ser. No. 10/756,956, filed Jan. 14, 2004 and Provisional Application filed May 28, 2003; Ser. No. 60/473,689. This application is a Continuation-In-Part application of Nonprovisional application Ser. No. 10/756,956, filed Jan. 14, 2004 now U.S. Pat. No. 7,013,817 that claims the benefit of provisional application Ser. No. 60/473,689. This application incorporates by reference PCT/US2004/16340 filed May 25, 2004, Nonprovisional application Ser. No. 10/756,956, filed Jan. 14, 2004 and Provisional Application filed May 28, 2003, Ser. No. 60/473,689.

BACKGROUND OF THE INVENTION

1. Field of the Invention

This invention relates to the use of modified alkaline earth oxides and carbonates for the effective reduction of a pollutant from flue gas resulting from the combustion of fossil fuel.

2. Description of Related Art

Power plants combust fossil fuels in boilers to create steam which is in turn used to power turbine-generators that produce electricity. At this time nearly one half of the electricity generated in the U.S. results from the burning of coal. When fossil fuel is combusted in a boiler, the sulfur present in fossil fuel reacts with oxygen to form sulfur dioxide. A small percentage of the resultant sulfur dioxide further reacts with additional oxygen present in the flue gas of the boiler to form sulfur trioxide. The combustion of fossil fuel also results in the production of mercury and arsenic which have deleterious effects upon unit performance and environmental health.

Traditionally, it has been assumed that approximately one percent of the sulfur contained in fossil fuel exits the combustion chamber as sulfur trioxide. The sulfur trioxide will react with moisture in the flue gas to form vapor phase sulfuric acid that will condense in the lower temperature regions of the boiler, more specifically the air heater as well as equipment farther downstream. Sulfuric acid has been found to form at temperatures less than 500 F. In addition to the substantial increase in fouling and corrosion to the equipment, the submicron sulfuric acid mist that exits the boiler exists as a finely divided aerosol, which deflects sufficient light in the atmosphere so that a visible "blue plume" becomes observable.

The "blue plume" creates anxiety in the community because everybody is concerned about the effects of industrial pollution. This situation is exacerbated when the flue gas is passed through a wet flue gas desulfurization system where the gas temperature is rapidly quenched to a temperature below the acid dew point.

Sulfur trioxide is classified as a Toxic Release Inventory substance therefore annual emission quantities must be reported to the Environmental Protection Agency. It is also very likely that pending environmental regulations will require the capture of very fine particulate, commonly referred to as "pm 2.5" which includes all particulate matter as well as condensable materials that are less than 2.5 microns in size. Such classification includes sulfuric acid aerosol. Many new construction permits being issued by individual States include condensable materials in the allowable total particulate emissions.

As would be expected, as the sulfur content in the fuel increases, the amount of sulfur trioxide formed in the boiler increases. Fuels typically used for the production of steam range from less than one percent to in excess of four-percent sulfur. Combustion of these fuels will therefore theoretically produce sulfur trioxide concentrations of approximately 5 ppm to 30 ppm, based upon the assumed conversion rate of one percent. Because of the relatively small concentrations of sulfur trioxide, little effort had traditionally been made to either measure or control this emission except for units firing costly oil.

Oil used for steam generation is also typically high in vanadium which increases the oxidation of sulfur dioxide to sulfur trioxide. The final temperature exiting the boiler is controlled such that the gas temperature does not fall below the sulfuric acid dew point. Typical boiler exit temperatures, downstream of the airheater range from 280 F. to 350 F. Reduction of sulfur trioxide therefore enables lower boiler exit temperatures thus improving the overall thermal efficiency of the unit. The more costly the fuel, the more significant it is to reduce sulfur trioxide and lower boiler temperature to create better efficiency.

Recently promulgated environmental regulations have required substantial reduction of nitrogen oxides from fossil fuel fired boilers. The preferred technology for high nitrogen oxide removal from fossil fuel fired boilers is selective catalytic reduction, commonly known as SCR. This technology generally entails the installation of an external chamber that is equipped with several layers of catalyst. Upstream of the catalyst, ammonia is injected and a chemical reaction occurs on the surface of the catalyst converting the nitrogen oxide and nitrogen dioxide to nitrogen and water. A side effect of this technology is that the catalyst also oxidizes additional sulfur dioxide to sulfur trioxide. The amount of oxidation is a function of many parameters including the chemical composition of the catalyst as well as factors such as flue gas flow rates, volume of catalyst, temperature, etc. The chemical activity of SCR catalyst is most reactive when initially installed, as it will deactivate with increased exposure time to the flue gas. The catalyst will generally oxidize anywhere from less than one percent to as much as three percent of the sulfur dioxide entering the reactor to sulfur trioxide.

With the increased use of SCR technology because of the recently promulgated environmental regulations, an observable increase in the amount of sulfuric acid plume has become evident. While historically few measurements have been made to monitor the amount of sulfur trioxide produced, the application of SCR technology has resulted in such action. Not only have anticipated oxidation rates been observed across the SCR catalyst, it has also been confirmed that the assumed boiler conversion rate of one percent can be as much as 50 to 100 percent lower than actual sulfur trioxide concentrations.

A number of utility companies have been sited by the EPA for violation of opacity limits after the SCR systems have been placed in service. Current regulations require the operation of the SCR systems only during the "Ozone Season" which is defined as May 1 through September 30 of each year while many of the proposed future environmental regulations will require 12-month operation. Once year round operation of the SCR begins, the corrosion and opacity problems will increase proportionally.

In addition to increased sulfur trioxide emissions, a small amount of ammonia passes through the SCR reactor without reacting with the nitrogen compounds. This un-reacted ammonia, commonly referred to as "ammonia slip" is typically anticipated to be less than 2 ppm for typical coal fired applications; although concentrations as high as 10 ppm have been recorded. The ammonia slip readily reacts with sulfur trioxide to form ammonium bisulfate, when an excess of sulfur trioxide exists, that accumulates on the airheater surfaces. As a result of this fouling, the heat transfer efficiency deteriorates thus increasing the cost of power production.

At the same time the pressure differential across the airheater increases; often, to the extent that the boiler load must be reduced. If the situation is allowed to persist, the unit must reduce load or be shut down to clean the airheater. All of these phenomena result in significant added cost to the utility operator and reduce unit reliability.

Further, many utilities have also elected to "co-fire" petroleum coke which results in even higher levels of oxidation. This occurs because the petroleum coke, which can have sulfur content ranging from 4 to 7 weight percent sulfur, also can contain between 1000 and 3000 ppm vanadium, which is a very strong oxidant. Field measurements have recorded sulfur trioxide levels as high as 80 ppm when co-firing petroleum coke. This practice is currently gaining wide acceptance because of economic considerations.

Because of the situation described above, a concerted effort has been made by many parties to develop technologies to reduce sulfur trioxide. One of the most comprehensive efforts taken in this regard has been funded by the United States Department of Energy. This ongoing program has examined the introduction of a number of materials into utility boilers at various locations. This work has included various forms of several alkali's including limestone, lime and magnesium oxide or hydroxide.

Limestone injection into the boiler, while quite effective at removing sulfur trioxide and the least costly additive on a unit basis, was quickly discarded as a viable technology because of the very high dosage rates required. The required high dosage rates are in the range of a stoichiometric ratio of about 40. These high dosage rates of limestone demonstrated excellent sulfur trioxide capture; however it also introduced sufficient calcium to affect boiler eutectics such that slagging occurred.

Regrettably, while offering the lowest alkali unit cost and the simplest form of introduction, placement on the coal belt, this alternative has been deemed unacceptable because of the slagging. The need for such high dosage rates results from the sintering of the calcium carbonate at the very high temperatures in the flame region of the boiler which are generally in the 2500-3000 F range. The sintering is often referred to "dead burning."

Other alkalis tested include various forms of magnesium, calcium and sodium. Magnesium may be added as magnesium oxide or magnesium hydroxide, the latter typically introduced as a slurry while the oxide form is added as a dry powder. Calcium hydroxide has been tested as both a dry powder and as a slurry. Irrespective of the chemical form in which these products are added, perhaps the most limiting factor is the ability to achieve adequate contact with the sulfur trioxide.

The cross sectional areas of large boilers can exceed 2000 square feet. Injection of a dry powder in the upper region of a boiler, where lower temperatures are more favorable for alkaline injection, would provide very poor flue gas/additive contact thus reducing the capture efficiency. While these products are capable of producing acceptable results with respect to sulfur trioxide capture, they require an elaborate and costly injection system and the unit cost per ton of available alkali is significantly higher than limestone. Further, injection into the furnace is subject to wide variability in flue gas flow rates as a function of unit load. The ideal injection point at 100 percent load may be poorest at a reduced unit load.

For the optimum system using magnesium, calcium or sodium it is therefore necessary to have a detailed temperature profile for each boiler over the range of anticipated operating loads. Multiple injection points would be preferred to help offset this impact adding to the complexity and cost of such system.

Testing has also been performed with the introduction of various alkalie downstream of the SCR and upstream of the airheater and electrostatic precipitator, typically as an aqueous solution. Once again, multiple lances or nozzles must be used to maximize contact with the pollutant.

Perhaps the most comprehensive research effort undertaken to investigate methods of reducing sulfur trioxide is the ongoing study being performed by the U.S. Department of Energy's National Energy Technology Laboratory. The semi-annual report titled "Sulfuric Acid Removal Process Evaluation: Short-Term Results", dated Mar. 4, 2002, as well as follow-up reports, authored by Gary M. Blyth and Richard McMillan, of URS Group, the prime contractor for this effort, discusses short term test results for several alkaline products. Of the many conclusions included in the report, the authors concluded that testing of the injection of dolomitc limestone through the burners should not be continued in the long term phase of the program. While the sulfur trioxide removal efficiencies with the dolomitic limestone were quite good, the amount required, stoichiometric ratios of approximately 40, and the adverse effects upon boiler operation because of the high dosage rate excluded this technology from further study.

While the study capture of sulfur trioxide is a very current effort, extensive development efforts have been performed in the past investigating furnace injection of limestone for sulfur dioxide control. While many of these efforts were exhaustive in nature, this technology has never gained commercial acceptance by the utility industry; primarily because of the low sulfur dioxide removal and the large amount of reagent required.

Landreth, et al, in his U.S. Pat. No. 5,246,364 teaches a method of injecting limestone through low NOx burners with mixing of the finely ground limestone with the tertiary air. While the Landreth technology is designed to capture a different pollutant, sulfur dioxide, as opposed to sulfur trioxide, his discussion of the impact of sintering of lime is germane to the teachings herein.

The Lavely U.S. Pat. No. 6,146,607 provides an excellent description of the calcinations on limestone. His teaches a method of injecting limestone into a furnace at a lower temperature range, collecting said resultant lime and utilizing it for sulfur dioxide capture after hydration.

BRIEF SUMMARY OF THE INVENTION

An object of this invention is to insert an alkaline admixture into a boiler to reduce the amount of a pollutant in a flue gas without slagging the boiler.

An object of this invention is to insert an additive at the most cost effective location but delay reaction of the additive until the additive reaches the best point chemically for the reaction to occur.

Another object of this invention is to be able to insert limestone, quicklime, hydrated lime, lime kiln dust, or blends of the above, to reduce the amount of a pollutant in a flue gas with the fossil fuel for the boiler but delay calcination until the limestone, quicklime, hydrated lime or lime kiln dust reaches a place in the boiler where the temperature will not cause said products to sinter.

This invention provides a process for reducing the amount of a pollutant from a flue gas resulting from combustion of fossil fuel in a boiler. An alkaline admixture is provided. The alkaline admixture is coated with a coating agent that improves dispersability and delays calcination of the alkaline admixture within a combustion zone and results in a coated alkaline admixture. In our tests, we used a common siloxane flow aid. Other flow aids which result in improved dispersability and delayed calcination may also be used. The coating agent can be one of many siloxane compounds commonly known as flow aid. The coated alkaline admixture is then introduced to the boiler to create a reaction that reduces the amount of the pollutant in the flue gas.

DETAILED DESCRIPTION OF THE INVENTION

DEFINITIONS

"reducing the amount of a pollutant" refers to actually decreasing the absolute amount of a particular pollutant which exits the stack.

"pollutant" means an environmental contaminate including but not limited to arsenic, sulfur trioxide, sulfur dioxide and mercury. It can be any combination of arsenic, sulfur trioxide, sulfur dioxide and mercury and or other pollutants. It can include a single contaminate or multiple contaminates.

"flue gas"—the resultant gaseous mixture resulting from the combustion of fossil fuel within the boiler.

"combustion of fossil fuel"—the burning of said fuel which chemically is the reaction of the fuel with oxygen.

"boiler"—the vessel in which heat is introduced resulting from the combustion of fuel and steam is produced from water by such heat. The water/steam is contained in tubes or pipes within the boiler. The resultant steam is then often used to turn a turbine/generator which produces electricity although in some cases steam is the final product.

"alkaline admixture" as defined herein alkaline admixture refers to a mixture of calcium and magnesium compounds including oxides, hydroxides and carbonates.

"coating agent—includes siloxane compounds and other flow aid products including but not limited, to trimethylsilyl-endblocked polymethylhydrogensiloxanes, trimethylsilyl-endblocked polydimethylsiloxanes, and hydroxyl-end-blocked polydimethylsiloxanes"

"improves dispersability" refers to the favorable modification of the distribution of solid particles throughout a gaseous media.

"calcination" the chemical decomposition of calcium carbonate and magnesium carbonate into their respective oxides and the evolution of carbon dioxide gas when exposed to temperatures high enough for said reactions to occur.

"delays calcination" the slowing down of the chemical reaction which occurs when calcium carbonate and magnesium carbonate are exposed to elevated temperatures.

"within a combustion zone" the lower region of the boiler where the fuel is introduced though a series of injection devices commonly referred to as burners.

"introducing the alkaline admixture" the simultaneous injection of fuel and admixture into the boiler.

"fossil fuel feed" the energy source which can include coal, petroleum coke, oil or natural gas.

"physical size"—relative or proportionate dimensions for example the physical size of the alkaline admixture is greater than 50% minus 200 mesh.

"addition rate"—the amount of admixture added to the fuel; generally in the range of 6 to 15 moles of total alkalinity per mole of sulfur trioxide removed. This also corresponds to a range of 0.3 to 2.0 weight percent of the fossil fuel.

DESCRIPTION

Figure 1:
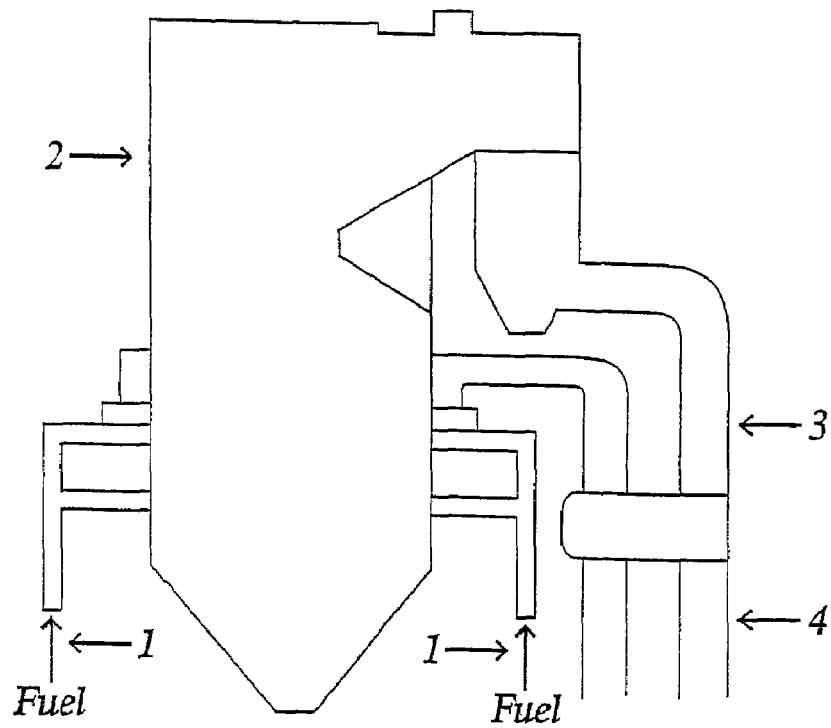
FIG. 1 is a simplified diagrammatic view of a typical boiler showing injection points.
Figure 2:
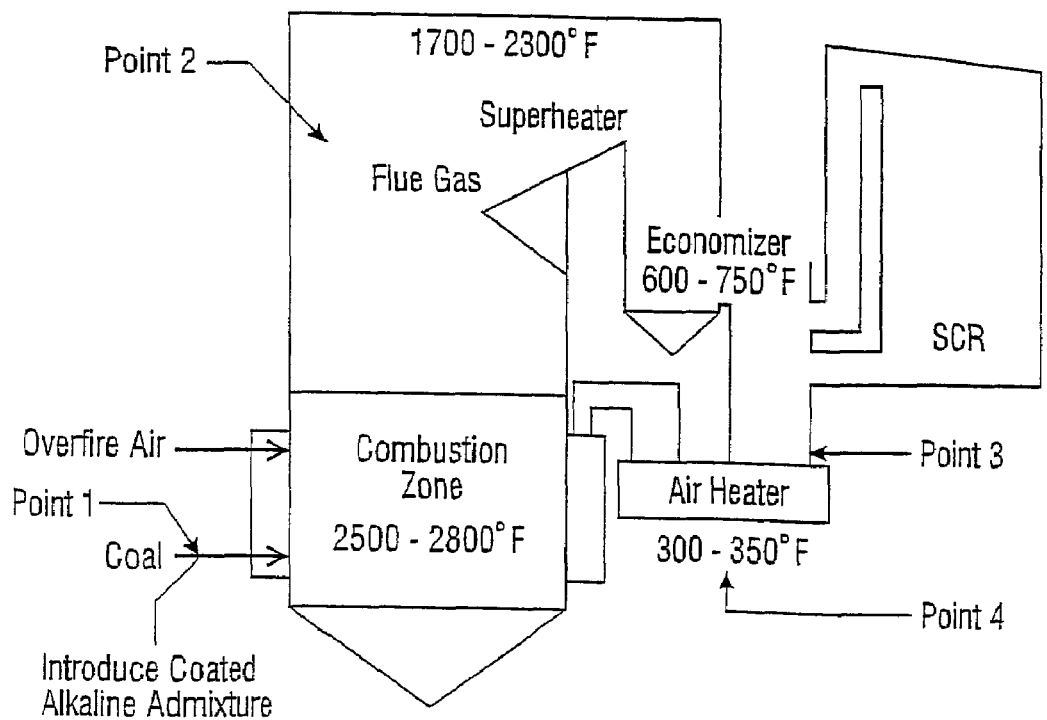
FIG. 2 is a simplified diagrammatic view of a typical boiler showing injection points.

FIG. 1 presents a simplified drawing of a typical boiler. Typical alkali injection locations are shown at the fossil fuel feed 1, the upper furnace 2, upstream of the air heater 3 and downstream of the air heater 4. The most cost effective injection point is the fossil fuel feed 1. Injection with the fuel also results in excellent mixing. However from a chemical perspective the fossil fuel feed 1 is not the best location because the alkaline admixture has to travel through the high temperature burning zone.

Limestone injection at the fossil fuel feed 1 has been tested by others and the results were unacceptable because of the high temperature in the burning zone. Temperatures in this region typically exceed 2500 F. When limestone containing calcium carbonate and magnesium carbonate is exposed to temperatures in excess of the respective decomposition temperatures (2500 F), carbon dioxide is driven off as a gas. Calcium carbonate decomposes at temperatures in excess of 1400 F. and magnesium carbonate at approximately 1200 F. As the gas escapes the limestone particle, channels are created thus increasing the surface area and reactivity. As the temperature increases above 2200 F. the channels begin to fuse together or sinter, commonly known as dead burning. This phenomenon is well known and has thoroughly been documented. Differential thermal analysis shows that the calcium carbonate fraction of calcitic limestone begins decomposition at Temperatures as low as 1200 F while magnesium carbonates decomposition begins at a lower temperature of about 925 F.

Because of this limitation with respect to temperature, alkaline injection typically occurs at the upper furnace 2, upstream of the air heater 3 and downstream of the air heater 4. Injection at these locations introduces a significant level of complexity as well as uncertainty with respect to good distribution.

In a preferred embodiment of this invention dolomitic materials are used. Such materials contain an equal molar ratio of calcium carbonate and magnesium carbonate. While the decomposition temperature of the calcium fraction remains unchanged, the magnesium fractions decomposition temperature increases by approximately 200 F. thus further reducing the tendency for sintering.

The degree of calcination is influenced by particle size of the limestone, temperature and residence time along with other conditions such as the partial pressure of carbon dioxide. Labelle et al. in their U.S. Pat. No. 5,919,038 thoroughly describes the calcination process and the impact of various parameters. When sintering occurs, the reactivity is significantly reduced. An excellent analogy is that of a sponge which will readily absorb many times it's weight in liquid because of the large pore volume and surface area. If the sponge is held over an open flame, the pores begin to fuse together thus reducing surface area as well as total pore volume. After extended exposure to the high temperature, the sponge looses its ability to absorb liquid.

From a chemical perspective, the ideal location to inject limestone is at the upper furnace 2, because of the lower temperature. However, it is not very practical because of poor mixing and difficulty in achieving good distribution across the large cross sectional area of the boiler. Additionally it is expensive to inject the limestone at the upper furnace 2. An ideal solution would utilize both the cost effective injection of the fossil fuel feed 1 and the best chemical point the upper furnace 2. In order to achieve this, one would have to introduce the limestone with the fuel but delay calcination until the limestone reaches the upper furnace 2 where ideal calcination temperatures exist. The present invention teaches how to accomplish this.

Finely ground limestone, quicklime, hydrated lime, lime kiln dust, or blends of the above are very hydroscopic and therefore has a profound tendency to agglomerate. By treating the said products with a siloxane compound, commonly referred to as flow aid, the agglomeration is substantially reduced. One such product is described by Nicholson in U.S. Pat. No. 4,208,388. While Nicholson readily admits the exact mechanism is unknown, its impact is profound. While the intent of Nicholson's teaching is to enhance the flowability of lime in a bulk phase, such as through a pipe or other conduit, its use in the present invention is to increase the quantity of individual particles, present when the lime is introduced into the boiler and provide a coating which delays the onset of calcination. The much lower mean diameter of the individual particles are much more readily carried by the upward flowing gas towards the upper end of the furnace thus reducing residence time. The second advantage of treating the product with a siloxane compound is that the smaller the particle, the better the distribution across the cross sectional area of the boiler. Production of the treated or coated admixture is easily accomplished by adding the appropriate amount of flow aid to alkaline product. Some degree of mixing is required but this can easily be accomplished by gradually feeding the flow aid onto the alkaline material as it passes through a screw conveyer. Another alternative is load a mixing device with a known quantity of alkaline product. To this, the appropriate amount of flow aid is added and the mixer is operated for anywhere from 5 minutes to 1 hour. Said mixing device could be one of many types commercially available or could include a cement truck or ball mill.

In the preferred embodiment of this invention, the alkaline admixture having a coating agent that improves dispersability and delays calcination of the alkaline admixture within a combustion zone is introduced into the boiler with the fossil fuel at the fossil fuel feed 1. A less attractive, but possible alternative is to pneumatically convey the product to the upper region of the furnace and introduce through a plurality of nozzles or lances. Once again, the coating agent provides for greatly enhanced individual particle distribution thus reducing pollutants such as sulfur trioxide, arsenic and mercury.

The preferred alkaline admixture for this process is a byproduct of the lime manufacturing process collected dry downstream of the actual calcination device or lime kiln; typically in a baghouse and commonly referred to as lime kiln dust or LKD. While LKD from both high calcium and dolomitic calcination processes is acceptable, the dolomitic product is preferred because of its high magnesium content. Lime kiln dust is comprised of very fine lime particles carried by the kiln off gas into the particulate collection device along with uncalcined limestone. Combustion byproducts from the lime calcining process are also included in the kiln dust. While coal fired calciners produce usable feedstock, the preferred material would be generated in a gas fired application thus eliminating undesired combustion byproducts such as silica, iron and alumina which dilute the efficacy of the product.

LKD byproduct use is preferred however if unavailable, an alkaline admixture such as CaO, $CaCO_3$, MgO and $MgCO_3$ may be produced by mixing of the various constituents. The CaO, $CaCO_3$, MgO and $MgCO_3$ can each be from 10 to 35% by weight of the total weight of the alkaline admixture. In order to reduce sulfur dioxide the mixture should have less than 10% Magnesium. The size of the alkaline admixture is preferably greater than 50% minus 200 mesh. The alkaline admixture is then coated with a siloxane compound, commonly referred to as flow aid in order to create a coated alkaline admixture. Alternatively, the flow aid material may be simultaneously added during the blending of the various constituents. The amount of siloxane compound used to create the coated alkaline admixture is from 0.05 to 0.15% percent by weight of the alkaline admixture.

An example of the use of LKD as the alkaline admixture is illustrated below. The LKD was first coated with Flow Aid.

The coated LKD was added to a 540 megawatt utility boiler. Prior to addition of the coated LKD the sulfur trioxide levels were measured at 28 and 30 ppm downstream of the economizer and upstream of the selective catalytic reduction system. Downstream of the SCR, the sulfur trioxide levels were measured at 49 and 68 ppm. After addition of the coated LKD at an addition rate of approximately 1 weight percent of the coal feed rate, the sulfur trioxide level was reduced to levels as low as 5.5 ppm.

Testing conducted on a 650 megawatt boiler demonstrated reductions in boiler sulfur trioxide levels from approximately 20 ppm prior to treatment to 6-8 ppm with addition of the coated LKD.

At a third full scale utility boiler, with a capacity of 620 megawatts, without the SCR in service, sulfur trioxide levels were reduced from approximately 19-24 ppm to less than 10 ppm. Most importantly, the visible "blue plume" typically present at the stack outlet disappeared after addition of the coated LKD.

An additional advantage of using the technology described herein is the ability to remove or complex gaseous phase arsenic upstream of the SCR system thus extending the operating life of the catalyst.

Typical fossil fuels fired for the production of steam range from less than a few ppm to as high as 80 ppm arsenic. Arsenic is a known material that will significantly reduce the operating life of SCR catalyst. High fuel arsenic content in combination with low free available calcium oxide in the fly ash has been proven to reduce catalyst life by as much as 50 percent. The addition of limestone into the furnace, although at lower dosages than described herein, is widely practiced throughout Europe as a means to extend catalyst life. This practice is now employed at several locations throughout the United States. The addition of the alkaline admixture having a coating agent will reduce the amount of gaseous arsenic in the flue gas.

Alternative technologies which involve injecting alkaline materials downstream of the SCR system will require a second alkaline addition system to control arsenic if the fuel consumed is high in arsenic.

The combustion of fossil fuel has been identified as a major source of gaseous mercury emissions. Its detrimental health effects are well known, therefore pending legislation will require significant reduction of mercury from flue gas. Over the last decade considerable research efforts have explored alternative control technologies including but not limited to the use of activated carbon. Madden, in her U.S. Pat. No.

6,528,030 teaches a control technology to capture mercury by way of alkaline sorbent injection. Her teachings include field test results. The removed mercury is converted to the solid phase and collected in the solids collection device. It is noteworthy however that her technology is limited to sorbent injection at temperatures less than 2000 F.; presumably a result of the sintering which occurs without treatment as taught herein. Our invention enables the use of the least costly and less intrusive addition of alkaline material directly with the fuel in the very high temperature combustion zone.

Flyash samples were collected from a 540 mw boiler before and after injection of the treated admixture. Prior to injection of our product the flyash collected had a mercury concentration of 12 ppb. After injection, the mercury concentration in the flyash increased nearly three fold to 30 ppb. This increase clearly demonstrates that additional mercury was being converted into the solid phase and collected by the particulate collection device.

Various changes could be made in the above construction and method without departing from the scope of the invention as defined in the claims below. It is intended that all matter contained in the above description as shown in the accompanying drawings shall be interpreted as illustrative and not as a limitation.

We claim:

1. A process for reducing the amount of sulfur dioxide in a flue gas resulting from combustion of fossil fuel in a boiler comprising:
    (a) providing an alkaline admixture having a siloxane coating agent that improves dispersability and delays calcination of the alkaline admixture within a combustion zone; and
    (b) introducing the alkaline admixture to the boiler to create a reaction that reduces the amount of the pollutant in the flue gas.

2. A process as recited in claim 1 wherein the alkaline admixture is comprised of $CaO$, $CaCO_3$, $MgO$ and $MgCO_3$.

3. A process as recited in claim 2 wherein a physical size of the alkaline admixture is greater than 50% minus 200 mesh.

4. A process as recited in claim 2 wherein the amount of $CaO$, $CaCO_3$, $MgO$ and $MgCO_3$ are each from 10 to 35% by weight of the total weight of the alkaline admixture.

5. A process as recited in claim 1 wherein an amount of the coating agent is from 0.05 to 0.15 percent by weight of the alkaline admixture.

6. The process as recited in claim 1 wherein the alkaline admixture has at least 5% magnesium by weight of the alkaline admixture.

7. A process as recited in claim 1 wherein an amount of coated alkaline admixture is from 2 to 15 moles of total alkalinity per mole of sulfur dioxide removed.

8. A process for reducing the amount of sulfur dioxide from a flue gas resulting from combustion of fossil fuel comprising:
    (a) providing an alkaline admixture having a coating agent that improves dispersability and delays calcination of the alkaline admixture within a combustion zone; and
    (b) adding the alkaline admixture to a fossil fuel feed within a combustion zone and thereby introducing the alkaline admixture to the boiler to create a reaction that reduces the amount of the sulfur dioxide in the flue gas.

9. A process as recited in claim 8 wherein the alkaline admixture is comprised of $CaO$, $CaCO_3$, $MgO$ and $MgCO_3$.

10. A process as recited in claim 8 wherein the amount of $CaO$, $CaCO_3$, $MgO$ and $MgCO_3$ are each from 10 to 35% by weight of the total weight of the alkaline admixture.

11. A process as recited in claim 8 wherein a physical size of the alkaline admixture is greater than 50% minus 200 mesh.

12. A process as recited in claim 8 wherein an amount of the coating agent is from 0.05 to 0.15 percent by weight of the alkaline admixture.

13. A process as recited in claim 8 wherein the alkaline admixture has at least 5% magnesium by weight of the alkaline admixture.

14. A process as recited in claim 8 wherein an amount of alkaline admixture is from 2 to 15 moles of total alkalinity per mole of sulfur dioxide removed.

15. A process as recited in claim 1 wherein less than 10% of the composition of the alkaline admixture is magnesium.

16. A process as recited in claim 8 wherein less than 10% of the composition of the alkaline admixture is magnesium.

* * * * *